Aug. 9, 1932.                A. R. KRAUSE ET AL                1,870,255
                           INNER TUBE AND TIRE MOLD
                    Filed Feb. 1, 1929        3 Sheets-Sheet 1
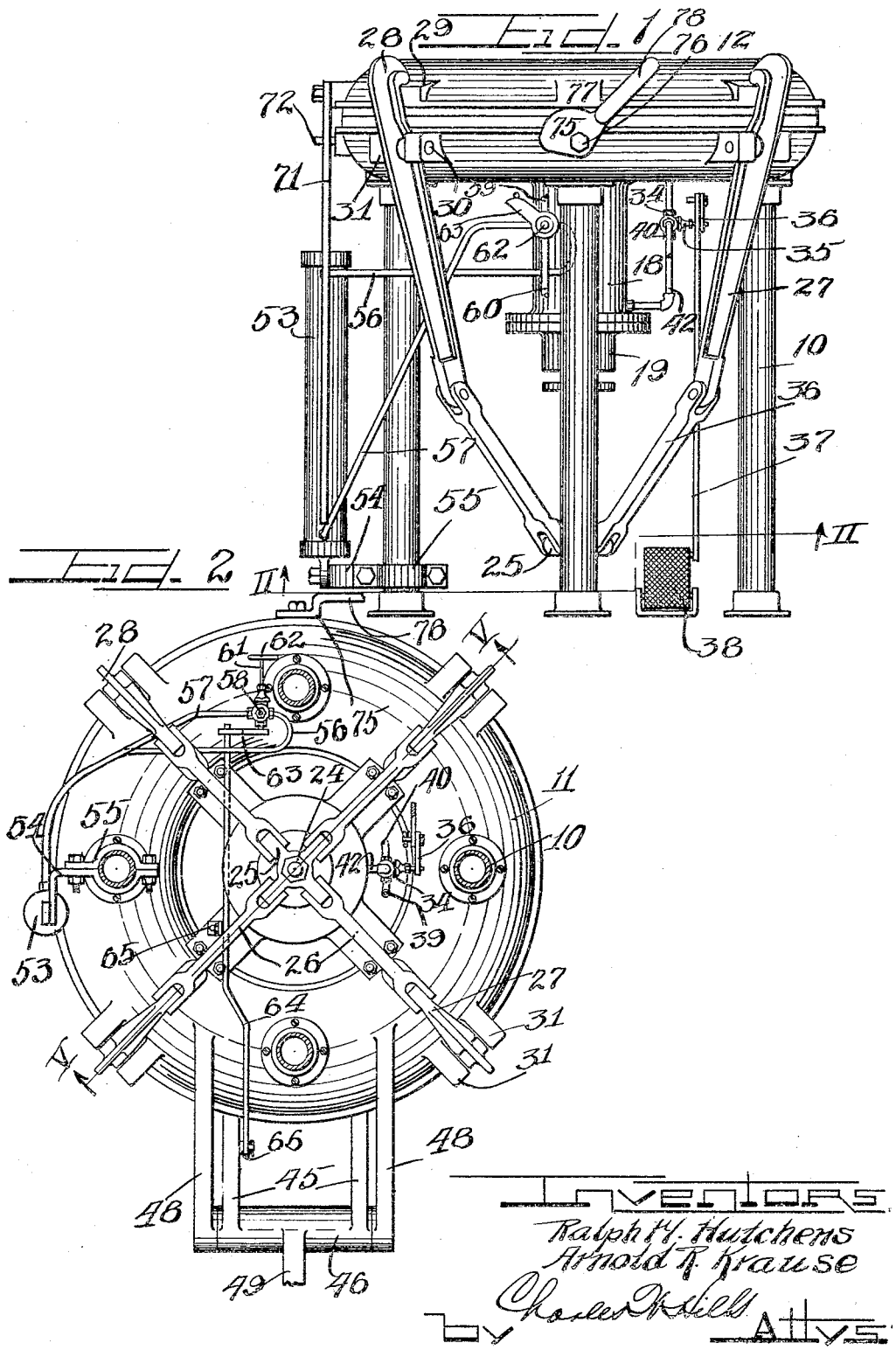

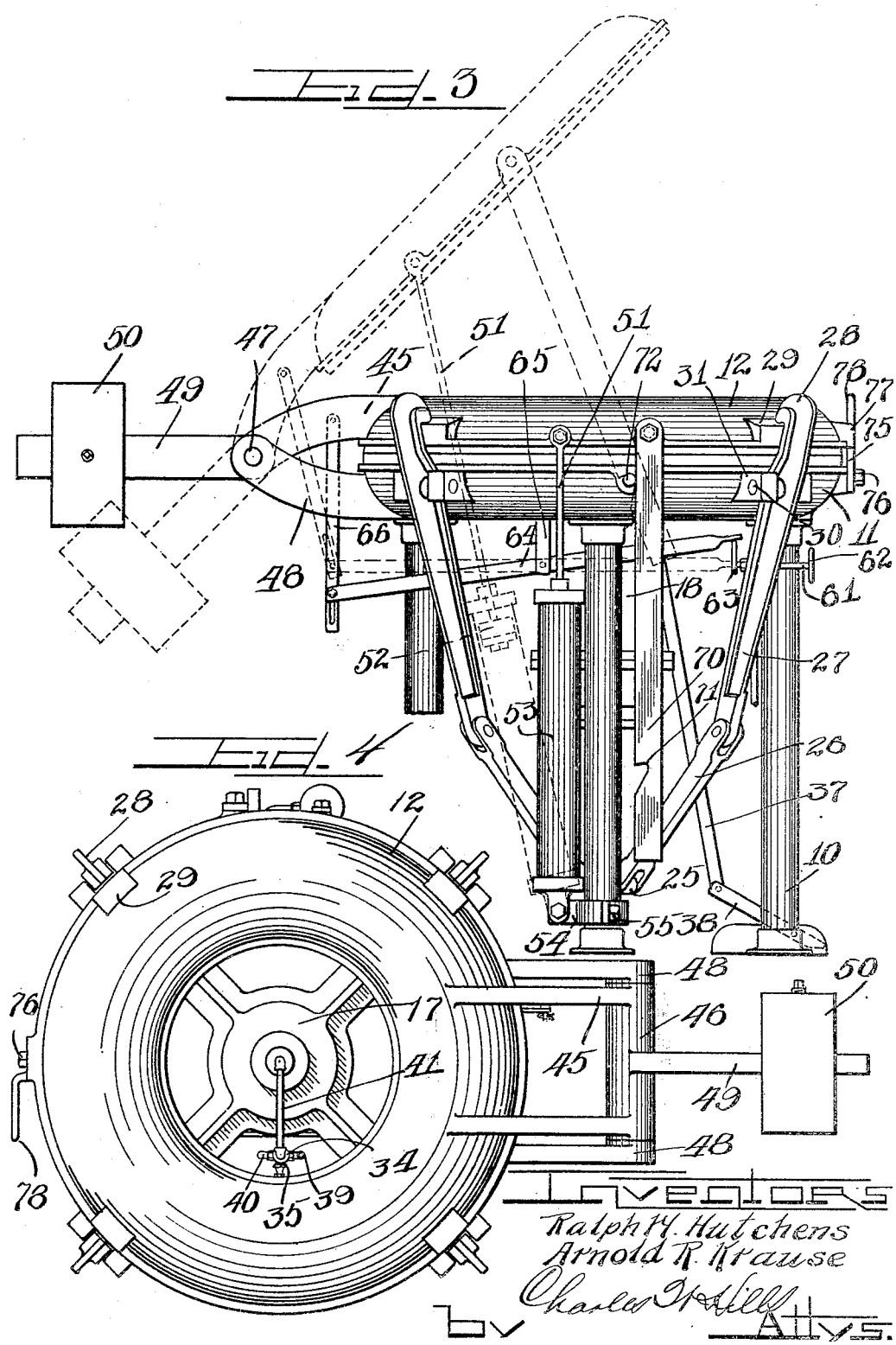

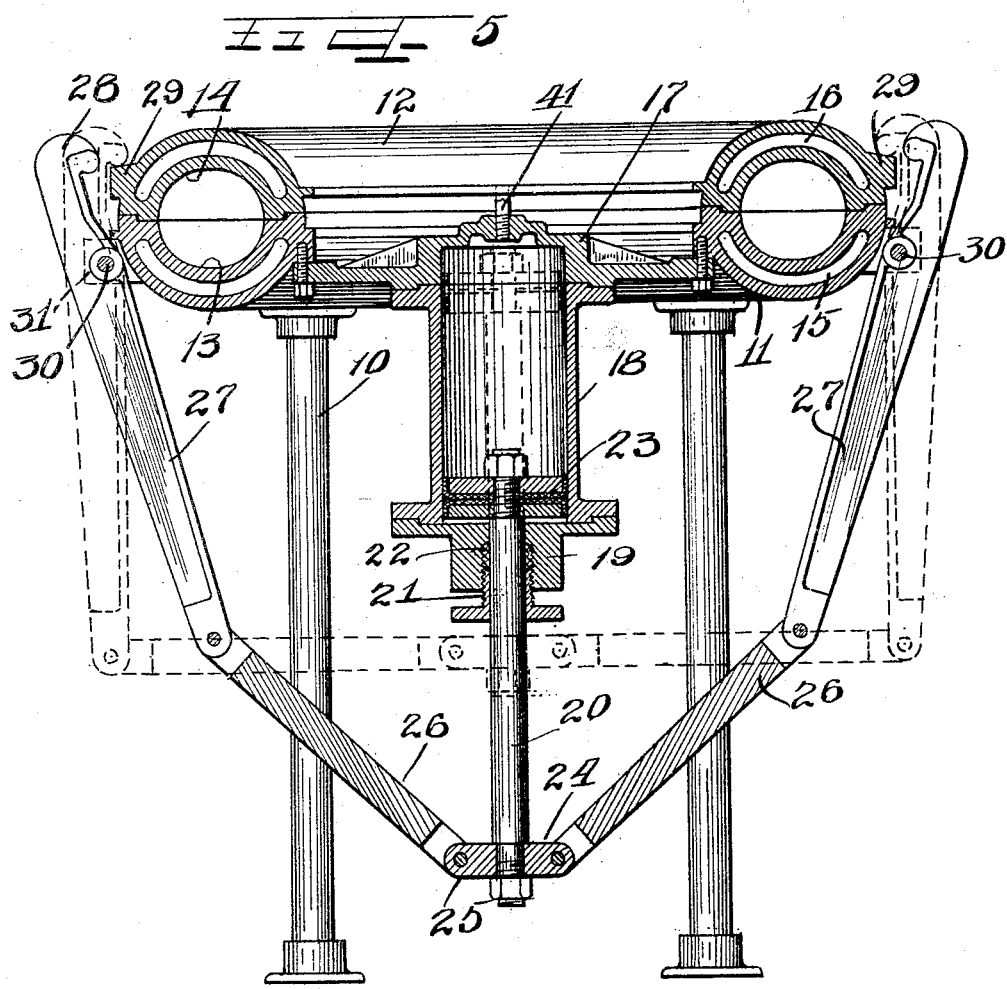

Patented Aug. 9, 1932

1,870,255

UNITED STATES PATENT OFFICE

ARNOLD R. KRAUSE AND RALPH W. HUTCHENS, OF EAU CLAIRE, WISCONSIN, ASSIGNORS TO GILLETTE RUBBER COMPANY, OF EAU CLAIRE, WISCONSIN, A CORPORATION OF WISCONSIN

INNER TUBE AND TIRE MOLD

Application filed February 1, 1929. Serial No. 336,767.

This invention relates to molds and more particularly to a two-part ring-like mold adapted for use in the vulcanizing of tubes or tires.

An object of the present invention resides in the provision of improved mechanism for clamping and locking the sections of a two-part vulcanizer together.

Another object of the invention is to provide automatically operated mechanism for clamping and locking the sections of a two-part mold or vulcanizer together.

Still another object of the invention is to improve the mechanism employed for moving the movable mold section out of cooperation with the stationary section of a two-part vulcanizer.

A further object of the invention is to provide a two-part vulcanizer wherein the mechanism used to clamp the sections of the mold or vulcanizer together is arranged to automatically lock the sections in cooperation upon the conclusion of the clamping stroke.

In accordance with the general features of the present invention, there is provided a two-part mold or vulcanizer, one part of which is movable relative to the other, and clamp mechanism including linkage and hook-like clamp members for clamping the two parts together, the mechanism being so arranged that upon the completion of the clamping stroke, the linkage will be disposed at right angles to the clamping members, whereby the mold parts are locked in clamped engagement.

Other and further important objects of this invention will be apparent from the disclosures in the drawings and specification.

The invention (in a preferred form) is illustrated in the drawings and hereinafter more fully described.

On the drawings:

Figure 1 is a side elevation of a vulcanizer or mold embodying the features of this invention.

Figure 2 is a fragmentary view partly of section taken on substantially the line II—II of Figure 1 looking upwardly.

Figure 3 is another side elevation of the vulcanizer taken at right angles to Figure 1 and illustrating in dotted lines the position of the parts of the vulcanizer when the movable mold or section is out of cooperation with the stationary mold.

Figure 4 is a plan view of the vulcanizer.

Figure 5 is an enlarged sectional view taken on the line V—V of Figure 2 looking in the direction indicated by the arrows and showing in dotted lines the position of the clamping members and linkage when the mold sections are locked in cooperation.

The reference character 10 designates legs for supporting the fixed mold section or part 11. These legs 10 may be four in number and may also be equidistantly spaced from each other. Hingedly connected to the fixed mold section or part 11 is a mold section 12 disposed above the fixed section.

Each mold section is provided with a ring-like groove 13—14 having a semi-elliptical cross section. These two grooves 13 and 14 in the sections 11 and 12 cooperate with each other when the sections are in engagement to define an annular pocket for accommodating the tire or tube to be vulcanized. It will also be noted from Figure 5 that each section 11—12 has a ring-like steam jacket 15—16 into which steam may be introduced from any suitable source in a manner well known to those familiar with the present type of vulcanizer.

Disposed centrally of the vulcanizer and bolted to the stationary mold section or part 11 is a cylinder head plate 17 which serves to define the upper end of a cylinder 18 suitably connected thereto. The other and lower end of the cylinder 18 has suitably secured to it a closure block 19 through which extends a piston rod 20. A packing or gland 21 extends into a recess 22 in the block 19 and surrounds the piston rod 20. The upper and inner end of the piston rod 20 has secured to it a piston 23 movable within the cylinder 18. The lower end of the rod 20 has fastened to it a spider 24. The spider 24 comprises a plurality of radial extending arms 25 to each of which is pivotally connected the lower end of a link 26. When the piston 23 is in its lowermost position (Figure 5) these links extend upwardly and diagonally from the spider 24. The upper end of each of these links is pivotally attached to the lower end of a lever 27 having its upper end formed into a hook 28 shaped to engage the top of a lug 29 formed integral with the movable mold section 12. An intermediate portion of each of the levers 27 is pivotally mounted on a pin 30 connected to brackets 31 formed integral with the fixed mold section or part 11.

When the piston 23 is forced to its uppermost position, shown by dotted lines in Figure 5, the levers or clamping members 27 are each moved to a vertical position and the links 26 are all disposed in a horizontal plane and at right angles to the levers 27, thereby locking the hooks 28 in engagement with the shoulders or lugs 29 of the movable mold section 12. In other words, when the linkage and levers are in the dotted position shown in Figure 5, the movable mold section 12 is locked in cooperation with the stationary or fixed section 11.

A glance at Figures 1, 3 and 5 will serve to show that the lugs 29 have surfaces which are inclined downwardly and outwardly and are adapted for engagement with the hooks 28 of the levers 27. These inclined surfaces constitute in effect cam portions which co-operate with the hooks 28 in such a manner, that when the latter are urged toward the dotted positions shown in Figure 5, the hooks engage said inclined surfaces and force the upper section 12 downwardly into clamping engagement with the lower section of the mold. Thus, once the sections of the mold are juxtaposed as shown in Figure 5, then, except for manipulating the valve to cause the piston 23 to move, human agency is entirely dispensed with. In other words, upward movement of the piston 23 results not only in the positioning of the hooks 28 in overlying relation to the lugs 29, but serves further to cause said hooks to clampingly engage and urge said lugs downwardly.

A fluid, which may be steam or air, is supplied to the cylinder 18 through a control valve 34. (Figs. 1 and 4). The valve 34 includes a rotatable element 35 operable by a link element 36 which is pivotally connected to the upper end of a lever 37 connected at its lower end to a foot treadle 38.

The valve 34 is a conventional three-way valve and includes four openings to which inlet and outlet pipes 39 and 40 and the cylinder pipes 41 and 42 are connected. The fluid is supplied to valve 34 from any suitable source through the pipe 39. Normally, when the piston 23 within the cylinder 18 is not being operated by fluid, the steam or air supplied to the valve is passed directly from the inlet pipe to the outlet pipe 40. When it is desired to operate the piston within the cylinder, the operator steps on the treadle 38 and thus disconnects the outlet 40 from the inlet 39 and connects the inlet to either one of the pipes 41 or 42, depending upon the position of the piston 23 and the direction of movement of foot treadle 38. Thus by operating the foot treadle 38 it is possible to actuate the three-way valve so as to either move the piston 23 up or down, depending upon its position within cylinder 18 and the direction in which treadle 38 is depressed.

We shall now proceed to describe briefly the automatic mechanism for raising the movable mold section 12 out of cooperation with the fixed section 11. The movable section 12 has extending laterally from it a pair of spaced arms 45—45, which are connected by a tube or sleeve 46 pivotally mounted upon a shaft 47, carried by the spaced arms 48—48 secured to the fixed section 11. The sleeve 46 has secured to it and extending rearwardly therefrom an arm 49 upon which is mounted an adjustable counterweight 50.

Associated with the movable mold section 12 is a piston rod 51 which has its upper end pivotally connected to the side of the movable section and has its lower end connected to a piston 52. Piston 52 is reciprocable in a cylinder 53 pivotally connected at its lower end to a bracket 54, clamped at 55 to one of the standards 10.

As best shown in Figure 1, the upper end of the cylinder 53 has connected to it a flexible fluid line 56 and the lower end of the cylinder has connected to it a flexible fluid line 57. These two lines 56 and 57 are in turn connected to a conventional three-way control valve 58. The valve 58 has four openings, two of which are connected to the lines 56 and 57. The other two openings of this valve 58 are connected to inlet and outlet pipes 59 and 60.

The valve 58 (Figure 2) has a rotatable element 61 which is operable by either the hand wheel 62 or the arm 63. Associated with the arm 63 is one end of a lever 64 pivotally mounted between its ends upon a lug 65 secured to the under side of the fixed mold section 11. The other end of the lever 64 has a lost motion connection with the lower end of a link 66 pivotally connected at its upper end to one of the arms 45 (Figs. 2 and 3) of the movable section 12.

In Figures 1 and 3, it will be observed that the upper or movable mold section 12 has pivotally attached to it the upper end of a downwardly extending latch arm 70, which is provided, near its lower end, with a notch 71 formed to engage a lug 72 secured to the side of the fixed section 11. That is to say, when the movable section 12 is raised to the dotted position shown in Figure 3, the notch 71 on the latch arm 70 will receive the lug 72 whereby the movable section will be held in its raised position.

We also provide means for forcing the mold sections apart, which takes the form of a cam 75 pivotally mounted upon a bolt 76 secured to the fixed mold section 11 directly below a lug 77 formed integral with the side of the upper mold section 12. The cam 75 has a handle 78 which when pushed downwardly by the operator brings the cam surface of the cam 75 into engagement with the lug 77 on the movable section, whereby the two sections may be cammed apart.

The operation of our novel press or vulcanizer is briefly as follows: After the press sections 11 and 12 have been cammed apart by means of the cam 75, the operator turns the valve handle 62 to the right (Figure 1) until the arm 63 is moved in a slanting position over the free end of lever 64. This results in fluid being admitted to the cylinder 53 from the line 57 connected to the lower end of the cylinder. That is to say, the turning of the handle 62 to the right in Figure 1 causes the inlet pipe 59 to be connected directly to the line 57, whereby the fluid forces the piston 52 within the cylinder 53 to its uppermost position. The upward movement of the piston raises the movable mold section 12 to the dotted position shown in Figure 3, in which position the latch arm 70 engages the lug 72, so as to hold the section 12 in its elevated position.

During the raising of the mold section 12, the link 66 elevates one end of the lever 64 and causes the other end of the lever to engage and cam the arm 63 back to its normal position whereby the inlet pipe 59 is disconnected from pipe line 57 and connected to the outlet pipe 60 of valve 58. This means that when the valve is in its normal position, the fluid is being bypassed around the cylinder 53.

While the mold section 12 is in its raised position, the vulcanized tube is removed from the stationary mold section 11 and a new tube is placed therein preparatory to the vulcanizing of the same. Thereafter the operator turns the valve handle 62 (Figure 1) to the left and at the same time disengages the latch arm 70 from the lug 72. This operation of the valve 58 causes the inlet pipe 59 to be connected directly to the pipe line 56 associated with the upper end of the cylinder 53. As a result of this connection in the valve, the fluid is delivered from the inlet pipe 59 to the upper end of the cylinder 53, thereby forcing the piston 52 downwardly within the cylinder. Of course, it will be appreciated that the downward movement of the piston 52 is against the fluid within the lower part of the cylinder 53 and as a result this fluid in the lower part of the cylinder is gradually forced out of the cylinder through the pipe line 57 into valve 58 and out into the discharge or outlet pipe 60. This arrangement is advantageous since it enables the fluid in the lower part of the cylinder to act as a cushion during the lowering of the movable mold section.

The function of the counterweight 50, when it is in the dotted position shown in Figure 3, is to help maintain the movable section in its raised position, so that even should the latch arm 70 be accidentally displaced, there is no chance of the movable section falling onto the operator's hand during the charging of the lower section with the tube. On the other hand, during the lowering of the movable mold section, the counterweight 50 cooperates with the fluid to gradually lower the section into cooperation with the fixed section 11.

After the two sections have been moved into cooperation, the operator manipulates the valve handle 62 so as to return the arm 63 to its normal position shown in Figure 1. Then the operator steps on the treadle 38 to operate the three-way valve 34. By depressing the treadle 38 in one direction, the operator disconnects the inlet pipe 39 from the outlet pipe 40 and connects the inlet pipe 39 directly with the pipe 42 disposed in communication with the lower part of the cylinder 18. The fluid thus admitted to the cylinder 18 forces the piston 23 upwardly in the cylinder and causes the clamping members 27 to be moved to the dotted position shown in Figure 5 whereby the two mold sections are clamped tightly in cooperation. Steam may then be admitted to the jackets 15 and 16 through the manipulation of any suitable or conventional control mechanism.

After the vulcanizing operation has been completed, the operater depresses the treadle 38 in the opposite direction, whereby the pipe 42 is disconnected from the inlet 39 and connected with the outlet 40 and the inlet pipe 39 is connected to the pipe 41 disposed in communication with the upper part of the cylinder 18. This results in the piston being forced downwardly within the cylinder, thus displacing the fluid in the lower part of the cylinder, which fluid passes through pipe 42 and out into the outlet pipe 40. The lowering of the piston results in the clamping members 27 being moved out of cooperation with the movable mold section.

Thereafter the operator returns the treadle 38 to its initial or neutral position, in which position the inlet pipe 39 of valve 34 is disposed in direct communication with the outlet pipe 40. The movable mold section 12 may then be raised in the same manner as previously described.

Now it is of course to be understood that we have illustrated and described in detail the preferred form of our invention, the invention is not to be thus limited but only insofar as defined by the scope of the appended claims.

We claim as our invention:

1. In combination, a pair of cooperable mold casings, one of said casings being movable relative to the other, fluid means for raising and lowering said movable casing into cooperation with the other casing comprising a pivotally mounted fluid cylinder, a piston movable therein and a rod connected at one end to said piston and at its other end to one side of said movable casing and means for controlling the flow of fluid into said cylinder, said latter means being operable by the raising of said movable casing to disconnect the fluid from said cylinder when the movable casing has reached a given position.

2. In combination, a pair of cooperable mold casings, one being movable and the other being fixed, fluid means including valve for controlling the raising and lowering of said movable casing into and out of cooperation with the fixed casing, and means operable by the raising of said casing to render said fluid means ineffective when the movable casing has reached a given position, said latter means comprising a link connected to the movable casing, and a lever pivotally mounted between its ends upon the fixed casing, said lever having one of its ends connected to said link, and having its other end associated with said control valve for cutting off the fluid when the movable casing has reached its uppermost position.

3. A pair of relatively movable cooperating mold casings, means to draw said casings together in clamped relation, said means comprising an inclined surface on one of said casings, a lever pivoted on the other casing, said lever having a cam portion movable to slidably ride on said inclined surface, and power means to actuate said lever.

In testimony whereof, we have hereunto subscribed our names at Eau Claire, Eau Claire County, Wisconsin.

RALPH W. HUTCHENS.
ARNOLD R. KRAUSE.